Figure 1:
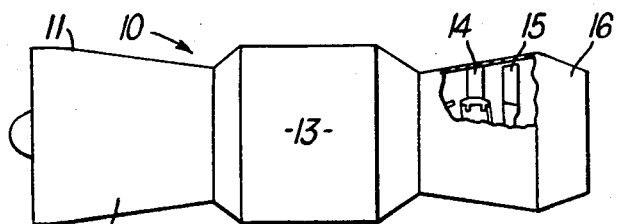

United States Patent

[11] 3,600,781

[72] Inventor Malcolm Ralph Scott
Shelton Lock, Derby, England
[21] Appl. No. 804,964
[22] Filed Mar. 6, 1969
[45] Patented Aug. 24, 1971
[73] Assignee Rolls-Royce Limited
Derby Derbyshire, England
[32] Priority Mar. 8, 1968
[33] Great Britain
[31] 11427/68

[54] METHOD OF PRODUCING A STATOR VANE FOR A GAS TURBINE ENGINE
4 Claims, 4 Drawing Figs.
[52] U.S. Cl. .................................................. 29/156.8 B,
113/116
[51] Int. Cl. .................................................. B21k 3/04,
B23p 15/02, B23p 15/04
[50] Field of Search ........................................ 29/156.8 B,
156.8 R, 156.8 H, 156.8 CF, 156.8 T; 113/116

[56] References Cited
UNITED STATES PATENTS
2,392,281 1/1946 Allen ............................. 29/156.8
3,012,308 12/1961 Zech ............................. 29/156.8

Primary Examiner—John F. Campbell
Assistant Examiner—Donald P. Rooney
Attorney—Cushman, Darby & Cushman ABSTRACT: A method of making stator vanes for a gas turbine engine comprises forming the radially outer surface of the vane platform, and/or the radially inner surface of the shroud of the vane, with a convex curvature, and thereafter reducing this convex curvature to a desired value such that the throat area defined between adjacent like stator vanes has the design value. Excessive curvature reduction may be compensated by bending the trailing edges and/or changing the angle of incidence of the vanes.

Patented Aug. 24, 1971

3,600,781

Inventor
MALCOLM RALPH SCOTT

By
Cushman, Darby & Cushman
Attorneys

METHOD OF PRODUCING A STATOR VANE FOR A GAS TURBINE ENGINE

This invention concerns a method of making a stator vane for a gas turbine engine, and, although the invention is not so restricted, it is more particularly concerned with a method of making turbine nozzle guide vanes.

The performance of a gas turbine engine is considerably affected by the value of the throat areas defined between the adjacent turbine nozzle guide vanes. It is not, however, easy to manufacture such turbine nozzle guide vanes in such a way that the throat areas will be exactly right for the particular engine in which they are installed.

According to the present invention, there is provided a method of producing a stator vane for a gas turbine engine comprising forming the inner surface of the platform thereof, and/or of the shroud thereof, with a convex curvature, and thereafter reducing the said convex curvature of the, or of at least one of the, inner surfaces so as to increase the throat area defined between like stator vanes to a desired value.

The term "inner surface" is intended to mean, throughout this specification and claims, that surface of the platform or of the shroud which is exposed in operation to the flow of working fluid through the gas turbine engine. Thus the "inner surface" of the platform is its radially *outer* surface, while that of the shroud is its radially *inner* surface.

Moreover, in order to compensate for excessive reduction of the said convex curvature, the trailing edge of the stator vane may be bent to reduce the distance between the said trailing edge and the blade portion of an adjacent like stator vane.

Alternatively, or additionally, in order to compensate for excessive reduction of the said convex curvature, the substantially axially extending edges of the platform and shroud may be machined so as to change the angle of incidence of the blade portion of the stator vane relative to the direction of gas flow through the gas turbine engine.

The invention also includes a stator vane, or a gas turbine engine provided with an assembly of angularly spaced-apart stator vanes as set forth above.

The invention furthermore includes a method of producing a gas turbine engine including the step of assembling a plurality of angularly spaced-apart turbine nozzle guide vanes each of which has been made by the method described above.

Figure 2:
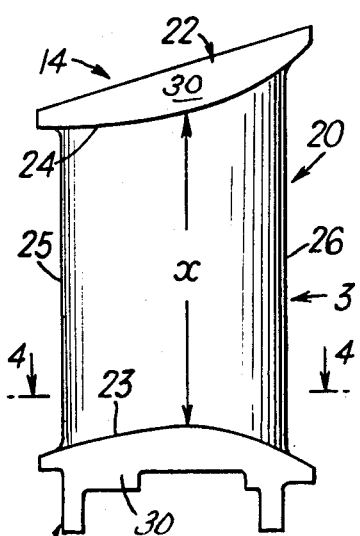
Figure 3:
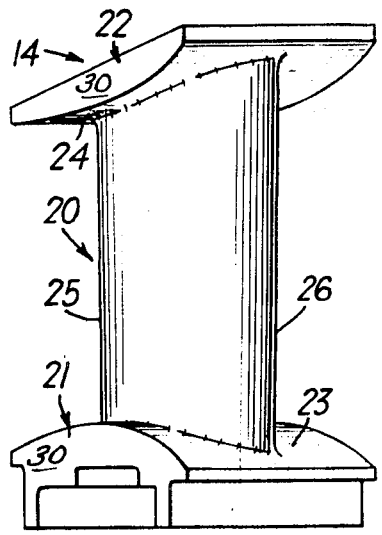
Figure 4:
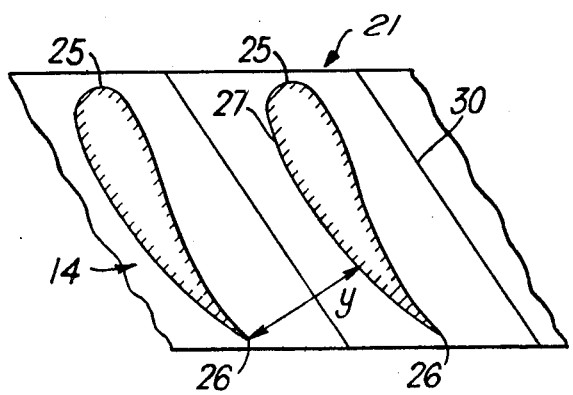

The invention is illustrated, merely by way of example, in the accompanying drawings, in which:

FIG. 1 is a diagrammatic view, partly in section, of a gas turbine engine which is provided with nozzle guide vanes which have been produced by the method of the present invention, FIG. 2 shows one of the said nozzle guide vanes on a larger scale, FIG. 3 is a perspective view of the nozzle guide vane of FIG. 2 looking in the direction of the arrow 3 thereof, and FIG. 4 is a broken-away developed view on the line 4—4 of FIG. 2.

In FIG. 1 there is shown a gas turbine engine 10 having an engine casing 11 within which there are mounted in flow series a compressor 12, combustion equipment 13, an annular assembly of angularly spaced-apart turbine nozzle guide vanes 14, and a turbine 15, the turbine exhaust gases being directed to atmosphere through an exhaust duct 16.

As shown in FIGS. 2 and 3, each of the nozzle guide vanes 14 has a blade portion 20 which extends between a radially inner platform 21 and a radially outer shroud 22, the platforms 21 of the row of vanes being connected by structure (not shown) to e.g. the outer race of a turbine bearing, as is well known.

The platform 21 and shroud 22 are respectively provided with convexly curved inner surfaces 23, 24, whose minimum distance apart is indicated by the double headed arrow $x$.

The blade portion 20 has a leading edge 25 and a trailing edge 26, the distance between the trailing edge 26 of one nozzle guide vane 14 and the convex surface 27 of the adjacent like nozzle guide vane 14 being indicated in FIG. 4 by the double headed arrow $y$. As will be appreciated, therefore, the throat area defined between adjacent nozzle guide vanes 14 is $xy$, these distances being coplanar.

If therefore the convex curvature of the inner surfaces 23, 24 is such as to make the distance $x$ the minimum value which would ever be required in practice, it will be appreciated that the throat area $x, y$ could easily be increased to the *actually* required value by appropriate machining of the inner surface 23 and/or of the inner surface 24 so as to reduce the convex curvature thereof.

If, as a result of this machining, the throat area had in fact been increased due to excessive reduction of the convex curvature of one or both of the inner surfaces 23, 24, this could be compensated for by bending the trailing edge 26 of each of the nozzle guide vanes 14 in such a direction as to reduce the distance $y$ between the said trailing edge and the convex surface 27 of the blade portion 20 of the adjacent nozzle guide vane 14.

Moreover, or alternatively, compensation for excessive reduction of the convex curvature of the inner surfaces 23, 24 could be effected by machining the substantially axially extending edges 30 of both the platform 21 and shroud 22 so as to change the angle of incidence of the blade portions 20 of the nozzle guide vanes 14 relative to the direction of gas flow through the gas turbine engine 10.

I claim:

1. A method of producing a stator assembly having a plurality of angularly spaced-apart stator vanes with a throat area between adjacent vanes of a desired value and with each stator vane having a platform member and a shroud member with a blade portion therebetween, said method comprising the steps of: forming an inner surface of at least one of said shroud and platform members of each of said stator vanes with a selected convex curvature to give a predetermined distance between the inner surfaces for providing a minimum throat area between adjacent vanes when said vanes are assembled, then assembling said stator vanes into the stator assembly and determining which throat areas between adjacent stator vanes are less than the desired value, and thereafter reducing the convex curvature on the said at least one inner surface of the adjacent vanes having throat areas less than the desired value so as to increase these throat areas to the desired value.

2. A method as claimed in claim 1 wherein the reducing of the convex curvature on the said at least one inner surface is accomplished by machining such surface.

3. A method as claimed in claim 1 in which, in order to compensate for excessive reduction of any of the convex curvatures of any of said members of said stator vanes, the trailing edge of such stator vane is bent thereby reducing the distance between such trailing edge and the blade portion of the adjacent stator vane.

4. A method as claimed in claim 1 in which, in order to compensate for excessive reduction of any of the convex curvatures of any of said members of said stator vanes, the substantially axially extending edges of the platform member and shroud member are machined so as to change the angle of incidence of the blade portion of the stator vane relative to the direction of gas flow through the stator assembly.